(12) United States Patent
Capiak et al.

(10) Patent No.: US 10,286,763 B2
(45) Date of Patent: May 14, 2019

(54) TONNEAU COVER

(71) Applicant: Techniplas, LLC, Nashotah, WI (US)

(72) Inventors: James Capiak, Three Oaks, MI (US); Keith Flatt, South Bend, IN (US); Robert Stephenson, II, Goshen, IN (US)

(*) Notice: Subject to any disclaimer, the term of this patent is extended or adjusted under 35 U.S.C. 154(b) by 0 days.

(21) Appl. No.: 15/856,822

(22) Filed: Dec. 28, 2017

(65) Prior Publication Data

US 2018/0186221 A1   Jul. 5, 2018

Related U.S. Application Data

(60) Provisional application No. 62/442,041, filed on Jan. 4, 2017.

(51) Int. Cl.
| | | |
|---|---|---|
| *B60J 7/10* | (2006.01) |
| *B60J 7/14* | (2006.01) |
| *H02S 30/20* | (2014.01) |
| *B60Q 1/32* | (2006.01) |
| *B60Q 1/52* | (2006.01) |
| *B60Q 1/46* | (2006.01) |
| *B60Q 1/26* | (2006.01) |
| *G08G 1/16* | (2006.01) |
| *H02S 40/38* | (2014.01) |

(52) U.S. Cl.
CPC .............. *B60J 7/108* (2013.01); *B60J 7/141* (2013.01); *B60Q 1/2661* (2013.01); *B60Q 1/32* (2013.01); *B60Q 1/46* (2013.01); *B60Q 1/525* (2013.01); *H02S 30/20* (2014.12); *G08G 1/16* (2013.01); *H02S 40/38* (2014.12)

(58) Field of Classification Search
CPC .......... B60J 7/108; B60J 7/141; H02S 30/20; B60Q 1/2661; B60Q 1/32; B60Q 1/46; B60Q 1/525
USPC ............ 296/100.02, 100.03, 100.04, 100.05, 296/100.06, 100.07, 100.08, 100.09, 296/100.1
See application file for complete search history.

(56) References Cited

U.S. PATENT DOCUMENTS

| | | | |
|---|---|---|---|
| 4,982,971 A * | 1/1991 | Marin | B60F 5/00 |
| | | | 280/30 |
| 5,909,921 A | 6/1999 | Nesbeth | |
| 6,217,102 B1 | 4/2001 | Lathers | |

(Continued)

OTHER PUBLICATIONS

International Search Report and Written Opinion dated Mar. 13, 2018, from the International Searching Authority, for International Application No. PCT/US17/68778 (filed Dec. 28, 2017), 12 pages.

*Primary Examiner* — Joseph D. Pape
(74) *Attorney, Agent, or Firm* — Ascenda Law Group, PC (57) ABSTRACT

A tonneau cover having integrated power sources and other accessories includes an outer portion and an inner structural portion. The power source may be one or more solar panels with associated power storage units for storing electrical energy. Accessories may include at least one rear warning sensor attached to a rear facing portion of the tonneau cover and configured to detect a distance to a following vehicle. A visual warning indicator may also be attached to the rear facing portion of the tonneau cover to indicate to the following vehicle when it is following too closely. Side lights and emergency lights integrated into the cover may also be included, as may additional accessories or ports for same.

11 Claims, 9 Drawing Sheets

(56) References Cited

U.S. PATENT DOCUMENTS

| | | | |
|---|---|---|---|
| 8,376,446 B2 * | 2/2013 | Golden | B60J 7/041 296/100.01 |
| 2006/0244283 A1 | 11/2006 | Thacker | |
| 2007/0241874 A1 | 10/2007 | Okpysh et al. | |
| 2010/0308617 A1 | 12/2010 | Golden | |
| 2013/0328348 A1 | 12/2013 | Agnew | |
| 2014/0063255 A1 | 3/2014 | Breed | |

\* cited by examiner

TONNEAU COVER

RELATED APPLICATIONS

This is a NONPROVISIONAL of, claims priority to, and incorporates by reference U.S. Provisional Application No. 62/442,041, filed Jan. 4, 2017.

FIELD OF THE INVENTION

The present invention relates to tonneau covers for pick-up trucks.

BACKGROUND

Pick-up trucks are primarily light-duty trucks (based on gross vehicle weight rating), characterized by an enclosed cab and an open cargo area or bed having relatively low sides and a tail gate. In addition to being employed as service vehicles, pick-up trucks are also used as passenger and "lifestyle" vehicles in both urban and rural areas. Pick-up truck owners often utilize a variety of devices to provide a covering for the bed of their truck.

One such covering is a camper top. Camper tops secure to and cover the bed of the truck and are typically designed to mount flush with the roof of the cab of the truck. Although camper tops create a large volume of usable space beneath the top, camper tops significantly alter the profile or aesthetic appearance of pick-up trucks.

Another type of truck bed covering is a tonneau cover. Tonneau covers are also designed to cover the bed of a truck. However, tonneau covers typically mount flush with the side walls of the bed so that the profile of the truck is very similar to that of a truck with an uncovered bed. Although tonneau covers create less usable space than camper tops, some truck owners prefer to maintain a traditional truck profile.

SUMMARY OF THE INVENTION

In various embodiments, a tonneau cover configured according to the present invention has one or more integrated power sources and other accessories, and includes an outer portion and an inner structural portion. The power source(s) may be one or more solar panels, with associated power storage units for storing electrical energy. One of the accessories may be by a rear warning sensor attached to a rear facing portion of the tonneau cover that is configured to detect a distance to a following vehicle. Another accessory may be a visual warning indicator that can also be attached to the rear facing portion of the tonneau cover to indicate to the following vehicle when it is following too closely. In addition to the above, or alternatively thereto, side lights and/or emergency lights may be integrated into the tonneau cover, as may additional accessories or ports for same.

BRIEF DESCRIPTION OF THE DRAWINGS

The present invention is illustrated by way of example and not limitation in the figures of the accompanying drawings, in which.

DESCRIPTION

Figure 1:
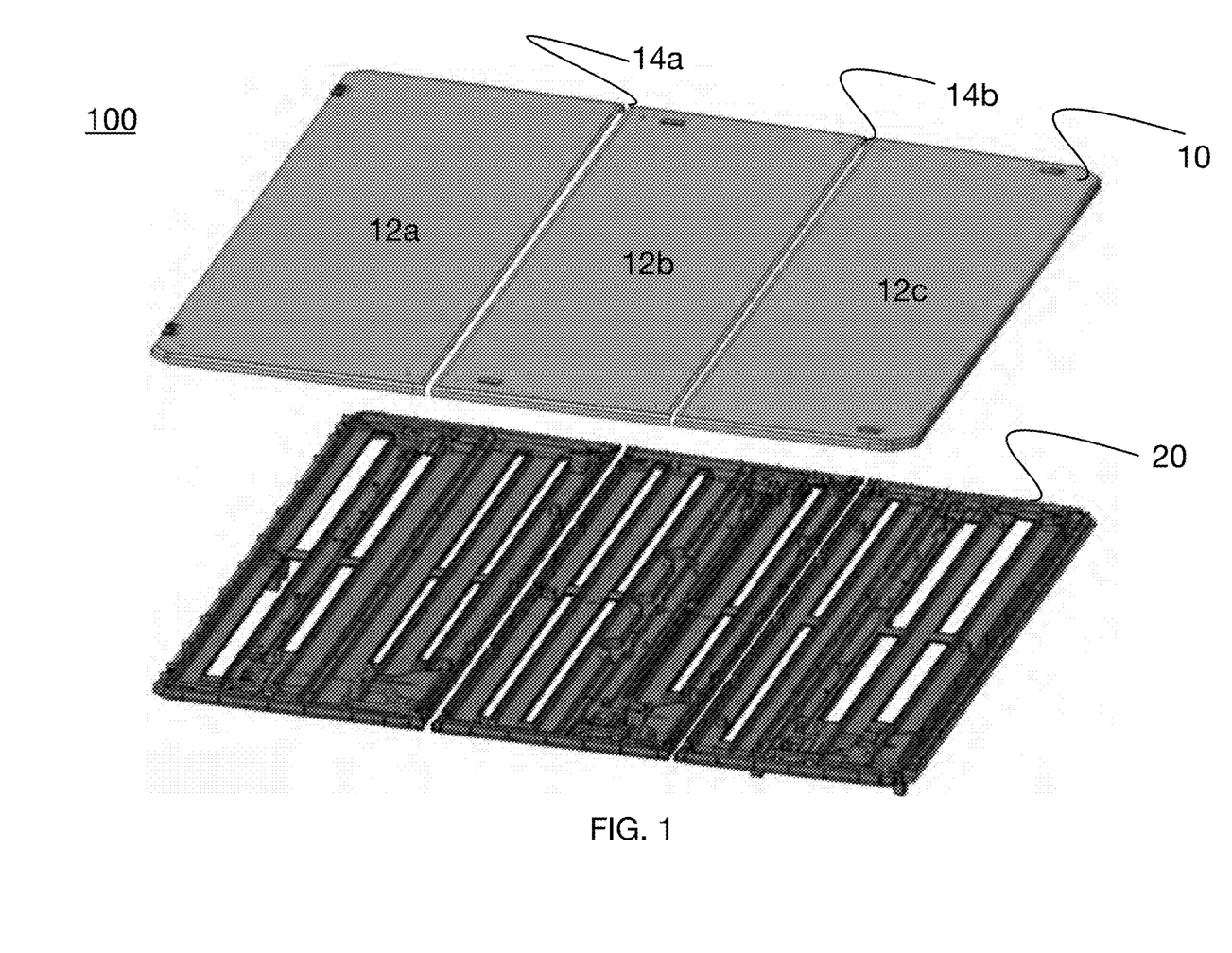
FIG. 1 illustrates an example of a tonneau cover.

Referring to FIG. 1, a tonneau cover 100 configured in accordance with an embodiment of the present invention can be constructed as a single piece molded plastic material, or can be molded as a two-piece structure with an outer section 10 and inner frame 20. In some instances, outer section 10 (and/or inner frame 20) may be covered with fabric. Outer section 10 is typically designed as a generally smooth surface to enhance the look and fit of the cover, as well as to possibly provide improved fuel efficiency by reducing drag due to air flow over an open bed, when installed on a pickup truck bed. Inner frame 20 is designed to increase the stability and overall rigidness of the cover 100.

Figure 6:
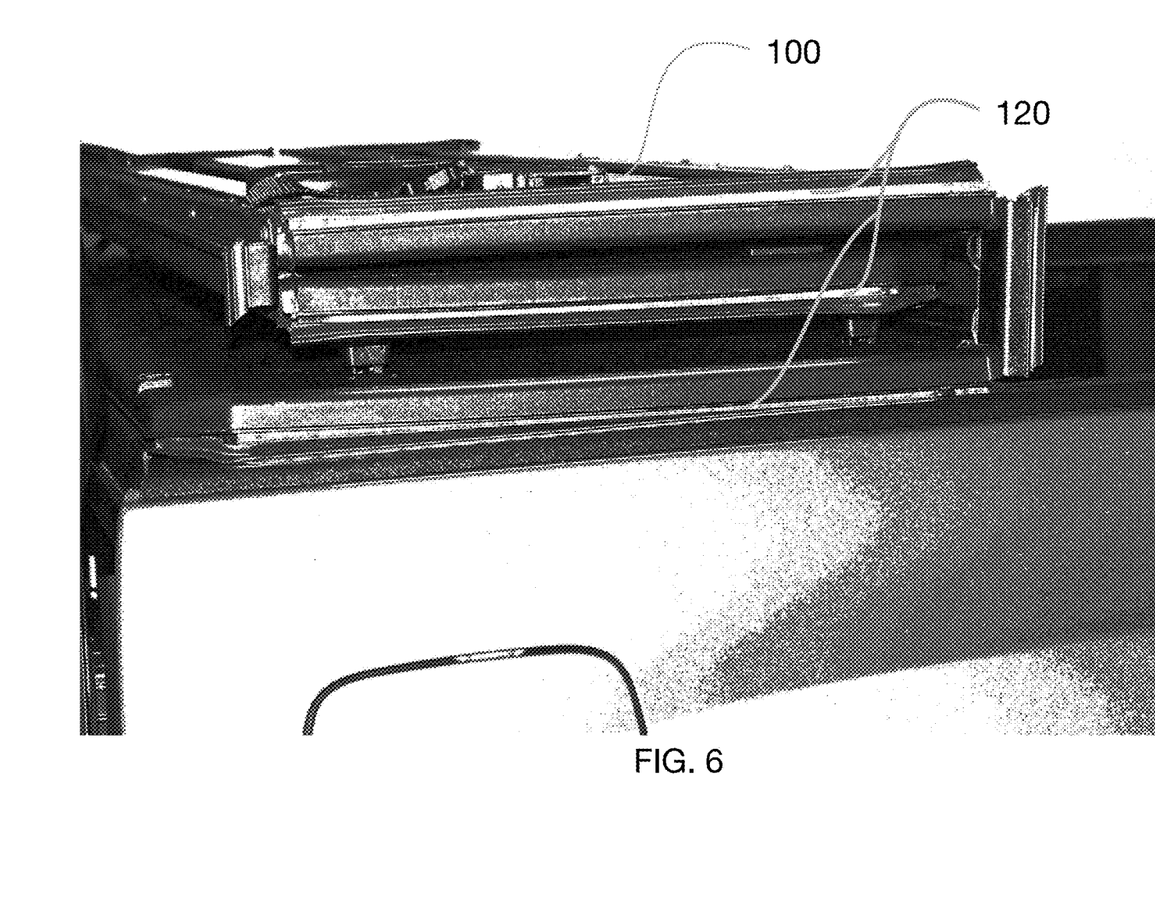
FIG. 6 illustrates the tonneau cover of FIG. 2, showing the cover in an open position for truck bed access in accordance with an embodiment of the invention.

Tonneau cover 100 is sized and shaped to fit over a bed of a pick-up truck, and is adapted to mount flush (or nearly so) with the side walls of the bed so that the profile of the truck when the tonneau cover is installed is very similar to that of the truck with an uncovered bed. When formed as separate outer section 10 and inner frame 20, these two components are secured to one another prior to installation on the pick-up truck. As shown, the tonneau cover 100 may be segregated into a plurality (e.g., three) sections 12a, 12b, 12c, and articulated by joint areas 14a, 14b, so as to allow these sections to fold on top of one another, as illustrated in FIG. 6.

As mentioned, outer section 10 is typically characterized by a generally smooth surface, but the surface may be textured so as to provide desirable anti-slipping characteristics for objects placed upon it, or to enhance its aesthetic appearance. Inner section 20 is sized to be complementary to outer section 10, and may have a rib-like structure, with gaps between the ribs, to provide longitudinal and lateral support to the tonneau cover, while reducing the weight thereof from that which would entail if a sold inner section were used.

Figure 2:
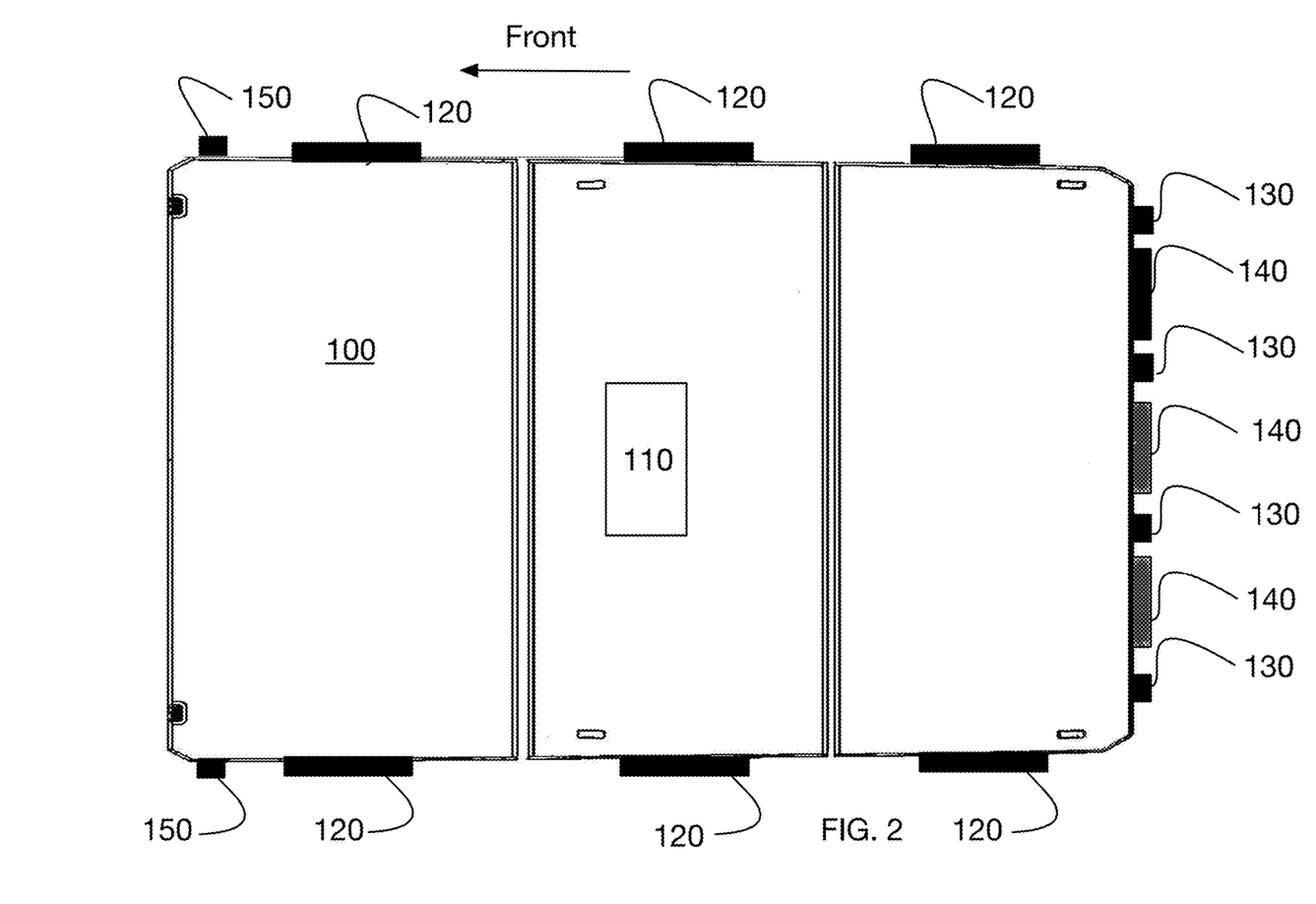
FIG. 2 illustrates a tonneau cover, showing an integrated solar panel, sensors, lighting features, and blind-spot cameras in accordance with an embodiment of the invention.

Referring to FIG. 2, tonneau cover 100 is shown with additional integrated elements in accordance with embodiments of the present invention. Tonneau cover 100 is preferably attached to a pick-up truck (or similar vehicle) bed with the front positioned towards the cab of the truck (see FIG. 3) and the rear positioned toward the truck tailgate and rear bumper. One or more solar panels 110 provide electrical power to a battery housed within the truck bed or other on-board location (not shown), a battery integrated in the cover 100 (not shown), or the vehicle battery (e.g., via a charging device to act as a supplemental charger for the vehicle battery). Having solar panel(s) 110 integrated with cover 100 provides a convenient way to include a power source for the tonneau cover accessories (or other accessories) without the need to run additional wiring from the vehicle's existing power sources. It further alleviates an additional load on the vehicle battery.

Side lights 120 provides a means to enhance the aesthetics of cover 100 while either parked or during vehicle operation. Side lights 120 may be instantiated in a variety of ways and preferably are transparent or translucent light tubes with light emitting diode (LED) emitters (also known as light pipes), but other materials and lighting methods can be utilized. Side lights 120 may be recessed beneath a portion of the top surface of the tonneau cover 100 to provide protection from rain, etc., and to enhance the visual appearance of the lighting provided thereby.

Figure 9:
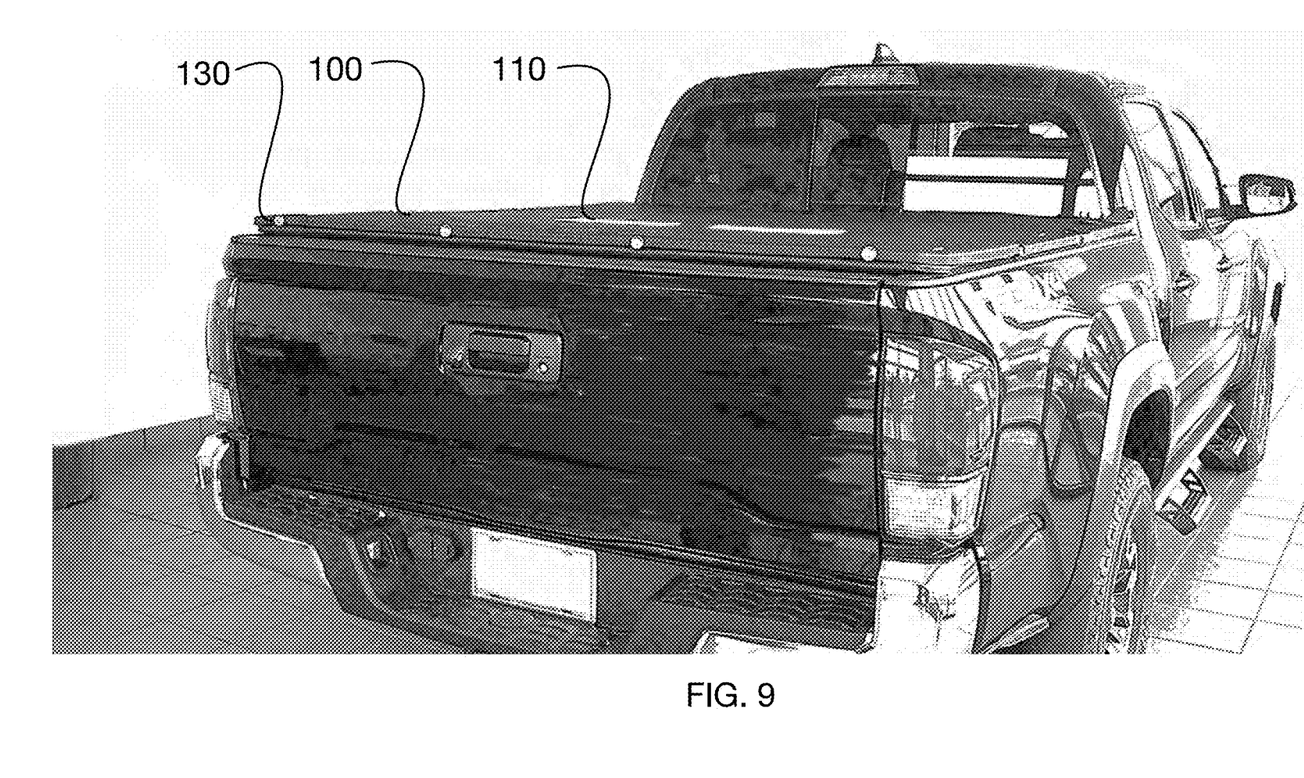
FIG. 9 illustrates rear sensors included in various embodiments of the present tonneau cover.

Rear sensors 130 (shown in additional detail in FIG. 9), which may be ultrasonic or laser sensors, provide a way to measure the distance from the rear of cover 100 to the front of a following vehicle. In operation, rear sensors 130 sense the distance of a following vehicle and signal a warning, via the rear warning lights 140, if the following vehicle is deemed to be following too closely or accelerating towards the vehicle equipped with tonneau cover 100. This rear warning system can be designed to operate in a number of modes; for example, the rear warning lights 140 may emit a steady warning light (e.g., red in color), a flashing warning light pattern at a steady frequency, or a flashing warning light pattern in which the frequency of flashing is adjusted based on the distance and/or closing velocity or acceleration of the following vehicle, to provide a visual warning for the following vehicle that they are following too close or accelerating dangerously towards to the vehicle equipped with tonneau cover 100. Rear warning lights 140 may be LEDs recessed below the outer surface of the outer section 10 of tonneau cover 100.

Figures 8A, 8B:
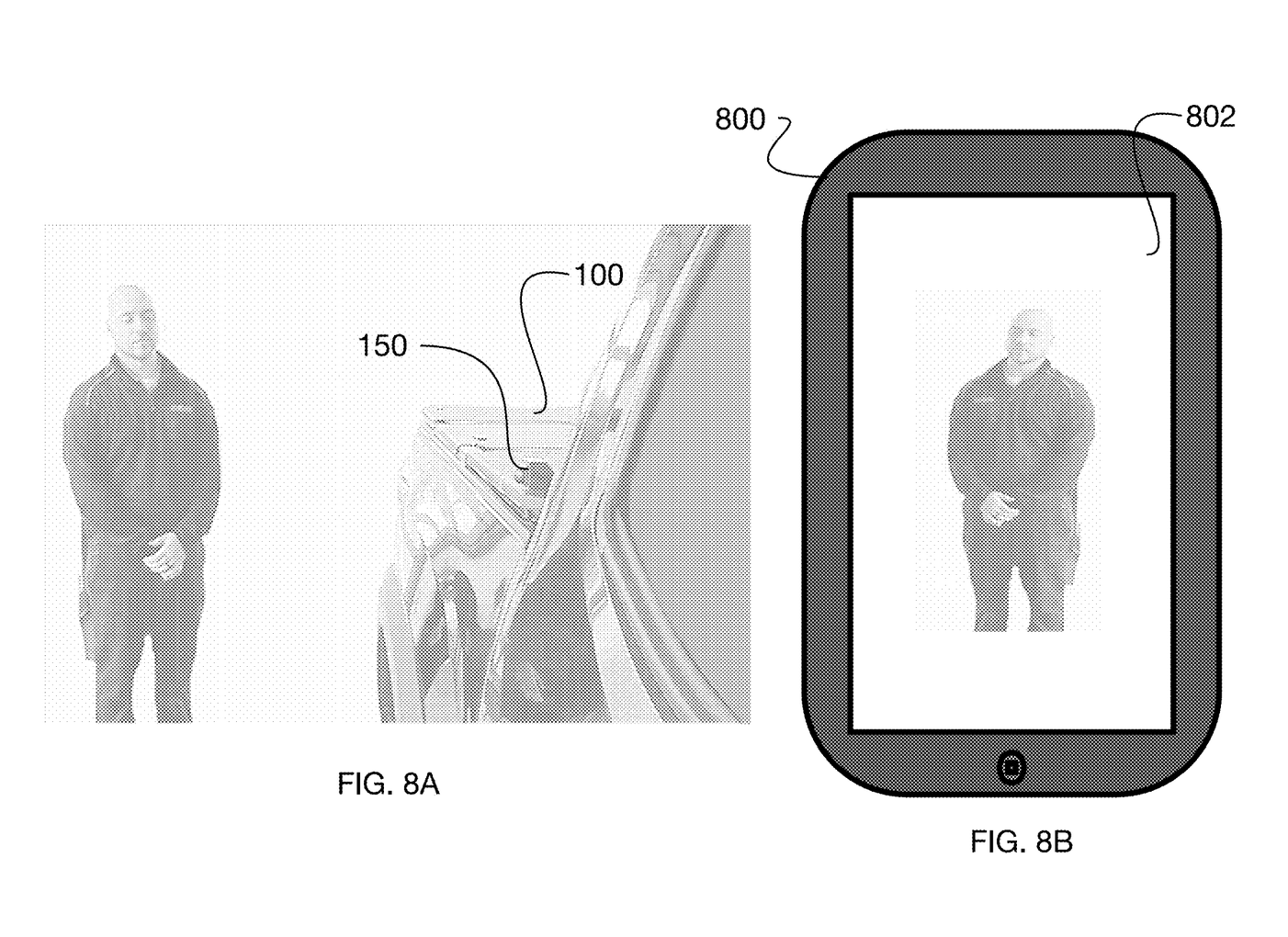
FIGS. 8A and 8B illustrate the use of blind-spot sensors of the present tonneau cover to provide images to a driver's smart phone or other mobile device.

Another feature of this embodiment is the provision of one or more integrated blind-spot sensors 150. Blind-spot sensors 150 can be either wireless cameras or sensors which are similar to rear sensors 130, which are able detect the presence of a vehicle in the blind-spots of the vehicle equipped with tonneau cover 100 without a visual picture for the driver. Blind-spot sensors 150, when utilizing wireless cameras, are provided power through the solar panel power system (or other means, e.g., on-vehicle power systems), and transmit a video image to a video screen (see FIGS. 8A and 8B) within the cab of the vehicle equipped with tonneau cover 100. For example, the images 802 may be provided to a driver's smart phone or other mobile device 800, or to a dedicated screen within the vehicle (e.g., a dashboard-mounted screen or a screen included in a rearview mirror or side mirror). Similarly, when the blind-spot sensors 150 are detectors only, a wireless signal can be transmitted to one or more of these receivers (e.g., a driver's smart phone or other mobile device, or a dedicated screen within the vehicle) to provide a warning to the driver if another vehicle is positioned within a blind-spot zone, without the need for a wireless video link. It can be appreciated that blind-spot sensors 150 could even be a combination video and sensor detection system to provide both a video link and warning system for improved blind-spot monitoring.

Figure 3:
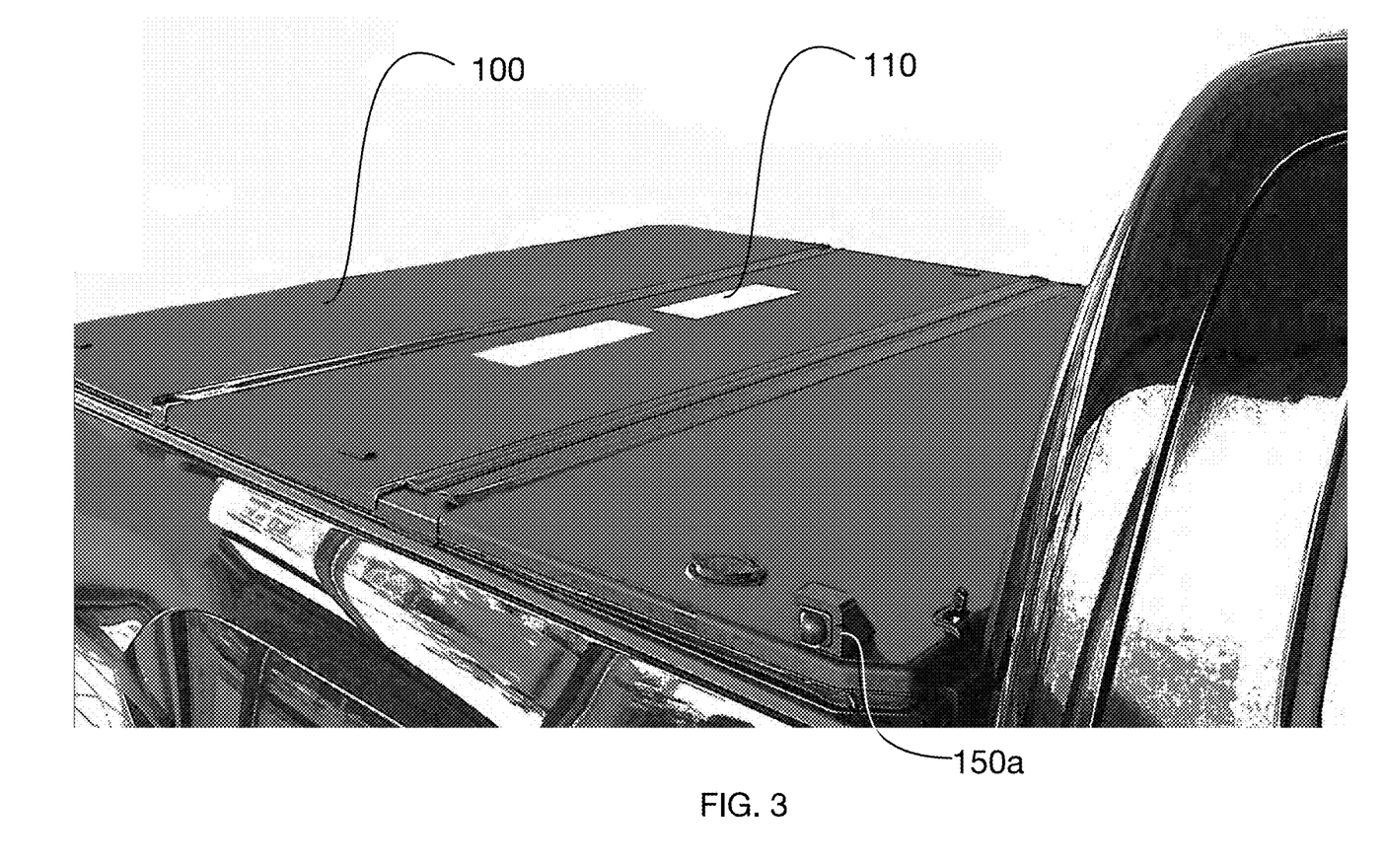
FIG. 3 illustrates the tonneau cover of FIG. 2, showing the cover attached to a pickup truck bed in accordance with an embodiment of the invention.
Figure 4:
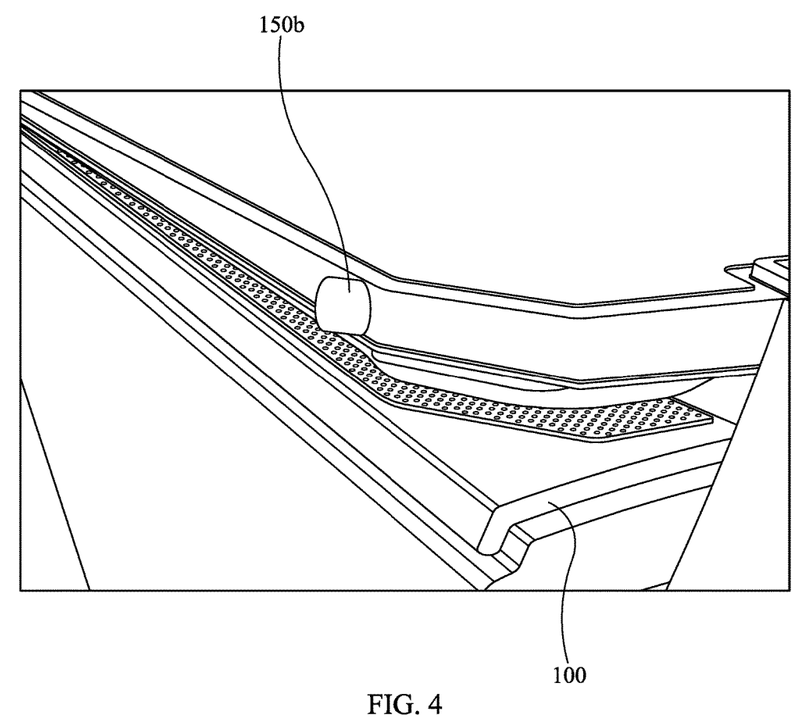
FIG. 4 illustrates the tonneau cover of FIG. 2, showing a close-up view of an integrated blind-spot camera within the cover in accordance with an embodiment of the invention.

Referring to FIG. 3, an embodiment of a tonneau cover 100 is shown mounted on a truck bed. In this embodiment, blind-spot sensor 150a is shown integrated above tonneau cover 100. FIG. 3 also shows a pair of solar panels 110 integrated within the top portion of tonneau cover 100. FIG. 4 shows another exemplary embodiment with a rear mounted blind-spot sensor 150b integrated within the profile of the tonneau cover 100.

Figure 5:
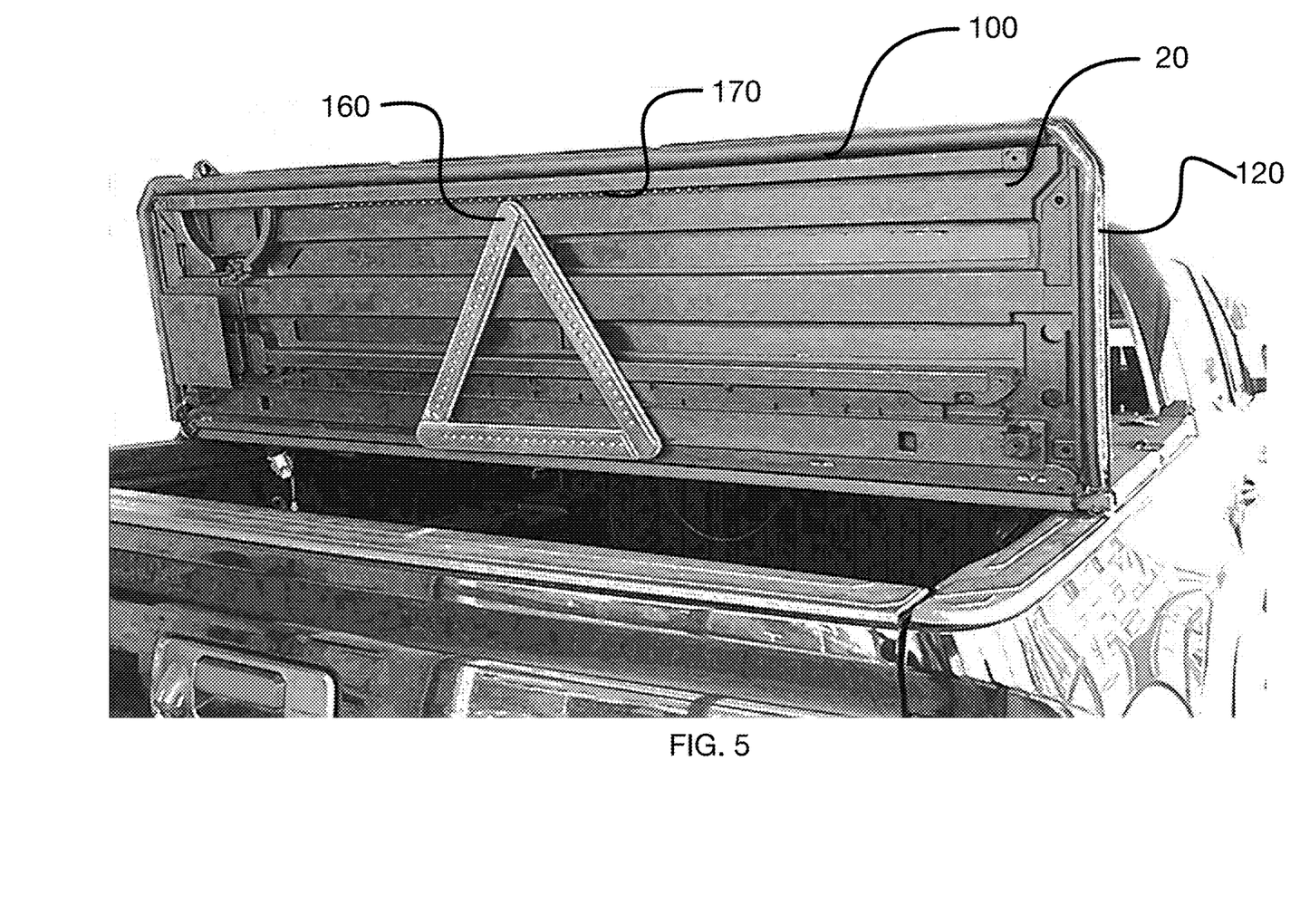
FIG. 5 illustrates the tonneau cover of FIG. 2, showing an integrated roadside hazard warning sign and integrated lighting in accordance with an embodiment of the invention.

Referring to FIG. 5, tonneau cover 100 opens from the rear of the truck bed to expose an integrated roadside warning safety triangle 160. As illustrated, the safety triangle (or other hazard indicator) is mounted to a rear section of the inner portion of the tonneau cover, so as to be visible when the section of the tonneau cover is articulated to an open position. In an exemplary embodiment, safety triangle 160 (or other emergency lights) can be lighted along its perimeter to increase visibility, as well as be connected to a wireless, possibly subscription-based, communication service, such as On-Star® or the like (not shown), which provides voice, data, and remote diagnostic communications between the vehicle and a communications center incorporated either as a pre-existing system in the truck or incorporated within tonneau cover 100. As an example, the initiation of safety triangle 160 lighting may automatically initiate a roadside assistance call through the wireless communication service. Also, safety triangle 160 can be set to flash an SOS or other pattern. Further, sensors incorporated within an electronics package (not shown) in tonneau cover 100 can also initiate an emergency call through the wireless communication service when a sudden deceleration (e.g., as may be associated with a crash) or another anomalous event is detected. Interior lighting 170 is also integrated along inner frame 20 of tonneau cover 100 for assistance in viewing contents within the truck bed. Opening tonneau cover 100 can automatically initiate interior lighting 170 and/or the lighting be selectively engaged via a switch panel (not shown). Lighting can be integrated along the entirety of inner frame 20 to enhance visibility along the entirety of the truck bed. Also illustrated in this view is are side lights 120 along the perimeter of tonneau cover 100.

Figure 7:
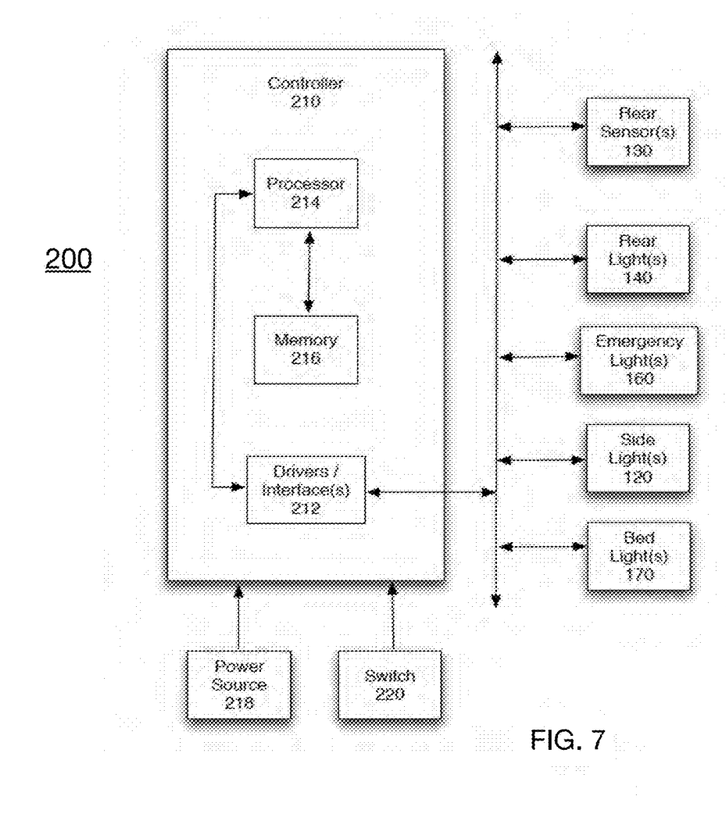
FIG. 7 illustrates an example of a system for the rear warning system in accordance with an embodiment of the invention.

Referring to FIG. 7, one embodiment of a control system 200 for tonneau cover 100 is shown. In this example, one or more rear warning sensors 130, rear warning lights 140, side lights 120, emergency lights 160, and bed lights 170 are coupled to a controller 210 through respective drivers/interfaces 212. The drivers/interfaces provide proper electrical coupling for each respective sensor/lighting system. Controller 210 also includes processor 214 and memory 216. Memory 216 stores computer-executable instructions, which instructions when executed by processor 214 cause processor 214 to operate the sensor and lighting systems described herein in the fashions discussed above. These operations are facilitated though the drivers/interfaces 212. A power source 218 is provided and, in some instances, may be a battery charged via the solar panel(s), as discussed above. Further, one or more switches 220 permit manual operation of various ones of the light systems, as discussed above.

In one embodiment, controller 210 receives sensor data for determining the distance of a following vehicle. In the event the controller determines that a following vehicle is too close, or is accelerating to rapidly towards the vehicle with tonneau cover 100, controller 210 will activate rear lights 140 (e.g., to emit a flashing light signal). The flashing pattern signal may increase in frequency as the following vehicle gets closer, shortening the distance from the sensors 130 to the following vehicle. In some embodiments, rear warning lights 130 are not activated unless data from at least two rear warning sensors 130 are indicate a following vehicle is too close, or is accelerating to rapidly towards the vehicle with tonneau cover 100. Individual sensors may be polled in sequential or other fashion to receive data concerning following vehicle distances.

With the incorporation of solar panel 110 and an integrated battery (not shown), USB ports, 12V DC-out socket(s) compatible with UL Standard 2089, or the like can be provided within tonneau cover 100 for on-demand DC power and an incorporated inverter (not shown) can be available for on-demand AC power without the need to use the vehicle's primary battery, thereby increasing total available power and decreasing the risk of drawing down the primary battery during extended power use. Additionally, an entertainment system including speakers and/or television screen can be integrated generally on inner frame 20 to provide for an enhanced tailgating experience for a user with the ability to utilize the modular features of tonneau cover 100 with an integrated battery power source. The integrated battery power system (not shown) further enhances functionality of tonneau cover 100 by providing a modular, pre-wired tonneau cover 100 with all necessary electronics wired through its own dedicated power system separate from the truck.

A Bluetooth module may be used to communicate with Bluetooth-enabled external devices. A USB port may enable external connections to other devices supporting the USB standard and charging capabilities. An external storage module may include any form of removable physical storage media such as a flash drive, micro SD card, SD card, Memory Stick, and the like.

Certain embodiments are described herein as including logic or a number of components, modules, or mechanisms. Modules or components may constitute software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the processor or processors may be located in a single location, while in other embodiments the processors may be distributed across a number of locations.

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. For example, the code can be stored on one or more non-transitory, or non-volatile tangible computer-readable media, and may be loaded into volatile media during execution or at other times (e.g., during a transfer between storage devices, etc.). Examples of these tangible computer-readable media can include, but are not limited to, hard disks, removable magnetic disks, removable optical disks (e.g., compact disks and digital video disks), magnetic cassettes, memory cards or sticks, read only memories (ROMs), flash memories or other solid-state devices (SSDs) and the like.

What is claimed is:

1. A tonneau cover, comprising:
    an outer portion and an inner portion, the inner portion having a rib-like structure and the outer portion having a substantially smooth surface;
    at least one solar panel integrated within the outer portion;
    a power storage unit connected to the at least one solar panel for storing electrical energy;
    at least one rear warning sensor integrated within a rear facing portion of the outer portion of the tonneau cover and being configured to detect a distance to a following vehicle; and
    a visual warning integrated within the rear facing portion of the outer portion of the tonneau cover to indicate to a following vehicle when it is within a pre-determined threshold distance of a vehicle to which the tonneau cover is affixed.

2. The tonneau cover of claim 1, wherein the outer portion and the inner portion include a plurality of articulated joints.

3. The tonneau cover of claim 1, further comprising a plurality of side lights integrated around a periphery of the outer portion.

4. The tonneau cover of claim 1, further comprising one or more blind spot detectors.

5. The tonneau cover of claim 4, wherein the one or more blind spot detectors comprise wireless cameras.

6. The tonneau cover of claim 4, wherein the one or more blind spot detectors comprise warning indicators.

7. The tonneau cover of claim 1, further comprising a hazard indicator mounted to a rear section of the inner portion of the tonneau cover, so as to be visible when the rear section is articulated to an open position.

8. The tonneau cover of claim 7, wherein the hazard indicator is a lighted safety triangle.

9. The tonneau cover of claim 7, wherein the hazard indicator is a safety triangle having a plurality of lights, said lights configured to turn on and off in a designated pattern.

10. A tonneau cover, comprising a plurality of blind spot sensors, at least one rear warning sensor, and a power supply coupled to provide power to the plurality of blind spot sensors and the at least one rear warning sensor, wherein the power supply includes at least one solar panel integrated within an outer portion of the tonneau cover, the outer portion of the tonneau cover is supported by an inner, rib-like portion, the inner and outer portions of the tonneau cover include articulating joints defining a plurality of sections of the tonneau cover, and the tonneau cover further comprises a visual warning system integrated within a rear facing portion of the outer portion of the tonneau cover to indicate to a following vehicle when it is within a pre-determined threshold distance of a vehicle to which the tonneau cover is affixed.

11. The tonneau cover of claim 10, further comprising one or more lights configured to be activated upon opening of a section of the tonneau cover.

* * * * *